United States Patent [19]

Misunas et al.

[11] 4,145,733
[45] Mar. 20, 1979

[54] DATA PROCESSING APPARATUS FOR HIGHLY PARALLEL EXECUTION OF STORED PROGRAMS

[75] Inventors: David P. Misunas, Brighton; Jack B. Dennis, Belmont, both of Mass.

[73] Assignee: Massachusetts Institute of Technology, Cambridge, Mass.

[21] Appl. No.: 721,083

[22] Filed: Sep. 7, 1976

Related U.S. Application Data

[63] Continuation-in-part of Ser. No. 605,932, Aug. 19, 1975, which is a continuation-in-part of Ser. No. 456,488, Mar. 29, 1974, Pat. No. 3,962,706.

[51] Int. Cl.² .................. G06F 3/00; G06F 13/00; G06K 17/00
[52] U.S. Cl. ........................... 364/200; 179/15 BA
[58] Field of Search ........ 179/15 AL, 15 AT, 15 BA, 179/15 BV, 18 ES; 364/200, 900

[56] References Cited

U.S. PATENT DOCUMENTS

| | | | |
|---|---|---|---|
| 3,343,135 | 9/1967 | Freiman et al. | 364/200 |
| 3,349,375 | 10/1967 | Seeber et al. | 364/200 |
| 3,537,074 | 10/1970 | Stokes et al. | 364/200 |
| 3,657,736 | 4/1972 | Boom et al. | 364/200 |
| 3,732,548 | 5/1973 | Howells et al. | 364/200 |
| 3,749,845 | 7/1973 | Fraser | 364/200 |
| 3,810,100 | 5/1974 | Hungerford et al. | 364/200 |
| 3,962,706 | 6/1976 | Dennis et al. | 364/900 |
| 4,032,899 | 6/1977 | Jenny et al. | 364/200 |
| 4,058,672 | 11/1977 | Crager et al. | 178/3 |
| 4,071,706 | 1/1978 | Warren | 179/15 AL |
| 4,074,232 | 2/1978 | Otomo et al. | 179/15 BA |

Primary Examiner—Gareth D. Shaw
Assistant Examiner—Jan E. Rhoads
Attorney, Agent, or Firm—Arthur A. Smith, Jr.; Gerald Altman

[57] ABSTRACT

A processor is described which achieves highly parallel execution of programs represented in data-flow form. The processor operates in a data-driven fashion; that is, an instruction of a program in the processor is enabled for execution upon the arrival of all required operands, and upon being executed, sends copies of the resulting value to all instructions which require it for their execution. The processor incorporates a form of deadlock prevention between the instructions of a data-flow program, allowing a value to be generated by an instruction and sent to the successor instructions in the computation only when those instructions are ready to receive the value. The incorporation of this mechanism prevents the possibility of conflict between successive stages of a pipelined computation and between successive iterations of an iterative computation.

23 Claims, 16 Drawing Figures

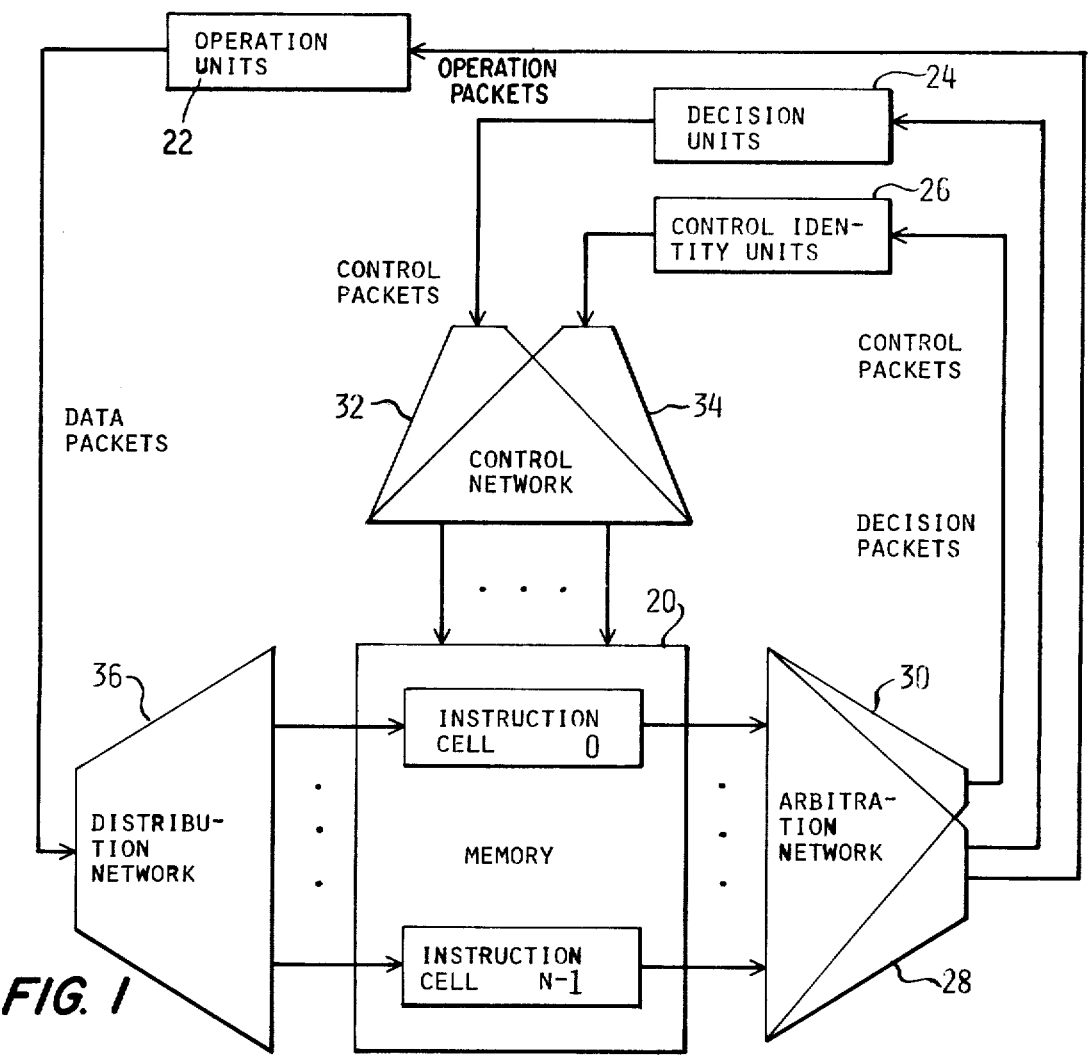
FIG. 1
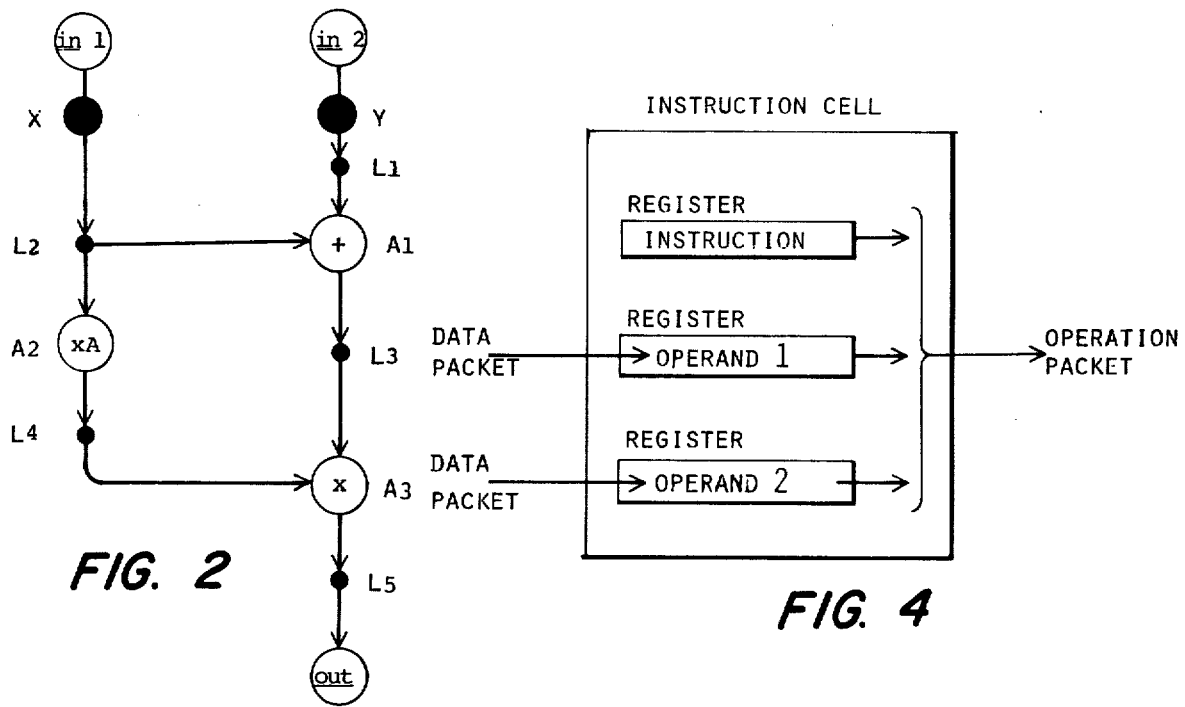
FIG. 2
FIG. 4

(A) OPERATOR (B) DECIDER (C) T-GATE (D) F-GATE (A) DATA LINK (B) CONTROL LINK (E) MERGE (F) BOOLEAN OPERATOR

| | CELL 0 | | |
|---|---|---|---|
| 0 | 1 | 1 | IDENT | 8, 10, c0-15 |
| 1 | TRUE | | X, TRUE |
| 2 | | | |

| | CELL 1 | | |
|---|---|---|---|
| 3 | 1 | 1 | IDENT | 4, 7, 11, c1-15 |
| 4 | TRUE | | Y, TRUE |
| 5 | | | |

| | CELL 2 | | |
|---|---|---|---|
| 6 | 0 | 0 | LESS THAN | 1, 4, 14 |
| 7 | NO | | ( ) |
| 8 | NO | | ( ) |

| | CELL 3 | | |
|---|---|---|---|
| 9 | 0 | 0 | SUBTRACT | 1, 4 |
| 10 | NO | | ( ) |
| 11 | NO | | ( ) |

| | CELL 4 | | |
|---|---|---|---|
| 12 | 0 | 0 | PRINT | c3-15 |
| 13 | CONS | | <FORMAT> |
| 14 | FALSE | | ( ) |

| | CELL 5 | | |
|---|---|---|---|
| 15 | 0 | 31 | IDENT | c0-1, c0-3, c0-21 |
| 16 | | | |
| 17 | | | |

| | CELL 6 | | |
|---|---|---|---|
| 18 | 1 | 1 | IDENT | 22, 26 |
| 19 | NO | | 0 |
| 20 | | | |

| | CELL 7 | | |
|---|---|---|---|
| 21 | 0 | 0 | ADD | 19, c4-15 |
| 22 | TRUE | | ( ) |
| 23 | CONS | | 1 |

| | CELL 8 | | |
|---|---|---|---|
| 24 | 0 | 0 | PRINT | c5-15 |
| 25 | CONS | | <FORMAT> |
| 26 | FALSE | | ( ) |

*FIG. 15*

| | CELL 0 | | | |
|---|---|---|---|---|
| 00 | 3 | 3 | INPUT | 7, 10 |
| 01 | CHANNEL 1 | | | |
| 02 | - | | | |

| | CELL 0 | | | |
|---|---|---|---|---|
| 03 | 1 | 1 | INPUT | 11 |
| 04 | CHANNEL 2 | | | |
| 05 | - | | | |

| | CELL 2 | | | |
|---|---|---|---|---|
| 06 | 1 | 1 | MULT | 13, c1-0 |
| 07 | ( ) | | | |
| 08 | A | | | |

| | CELL 3 | | | |
|---|---|---|---|---|
| 09 | 1 | 1 | PLUS | 14, c0-0, c0-3 |
| 10 | ( ) | | | |
| 11 | ( ) | | | |

| | CELL 4 | | | |
|---|---|---|---|---|
| 12 | 0 | 0 | MULT | 17, c0-6, c0-9 |
| 13 | ( ) | | | |
| 14 | ( ) | | | |

| | CELL | | | |
|---|---|---|---|---|
| 15 | 0 | 0 | OUTPUT | - |
| 16 | CHANNEL 3 | | | |
| 17 | ( ) | | | |

*FIG. 16*

DATA PROCESSING APPARATUS FOR HIGHLY PARALLEL EXECUTION OF STORED PROGRAMS

The Government has rights to this invention pursuant to Grant No. NSF-76-58-GI-34761 and Institutional Patent Agreement No. 0100 awarded by the National Science Foundation.

RELATED APPLICATIONS

The present application is a continuation-in-part of application Ser. No. 605,932, filed Aug. 19, 1975 in the names of the applicants herein for Data Processing Apparatus For Highly Parallel Execution of Stored Programs, which is a continuation-in-part of application Ser. No. 456,488, filed Mar. 29, 1974, now U.S. Pat. No. 3,962,706, issued June 8, 1976, in the names of the applicants herein for Data Processing Apparatus for Highly Parallel Execution of Stored Programs.

BACKGROUND

The study of the expression of concurrent operation within programming languages has yielded a data-driven form of program representation known as data flow. The development of the data-flow representation was accompanied by the development of a processor designed to fully exploit the local parallelism exposed by the data-flow representation. The architectures of two such processors are described in related applications Ser. No. 456,488, now U.S. Pat. No. 3,962,706, and Ser. No. 605,932, which are incorporated into the present specification by reference.

SUMMARY

The Elementary Processor presented in application Ser. No. 456,488, now U.S. Pat. No. 3,962,706, was designed to execute a simple class of programs which are well-suited for the representation of signal processing computations. This class of programs permits only elementary computation; no decision capability is provided. The Basic Processor presented in application Ser. No. 605,932, adds conditional and iterative constructs to the language and architecture and incorporates a multi-level memory system in which the active memory is operated as a cache, and individual instructions are retrieved from the auxiliary memory as they are required for computation. It is desired to expand the capabilities of The Elementary and Basic Processors to avoid a possible deadlock condition in the execution of stream-oriented and iterative computation. The present disclosure describes the modification of the data-flow language to incorporate these safeguards and the corresponding additional capabilities within The Elementary and Basic Processors.

Generally, the illustrated embodiment features an active memory for holding at least a record of active instructions, at least an operation unit for managing signals in correspondence with data computations, at least a decision unit for managing signals in correspondence with selections, at least a control identity unit for managing signals in correspondence with program control, a first arbitration network for transmitting signals representing information packets from the active memory to the operation and decision units, a second arbitration network for transmitting signals representing information packets from the active memory to the control identity units, a first control network for transmitting signals representing information packets from the decision units to the active memory, a second control network for transmitting signals representing information packets from the control identity units to the active memory, and a distribution network for transmitting signals representing information packets from the operation units to the active memory. In a modification of the foregoing association of components, the decision units and the first control network are omitted in order to provide a machine of a less sophisticated computational capability.

The invention accordingly comprises the system of the present disclosure, its components and their interrelationships, the scope of which will be indicated in the appended claims.

BRIEF DESCRIPTION OF THE DRAWINGS

For a fuller understanding of the nature and objects of the present invention, reference is to be made to the following description, which is to be taken in connection with the accompanying drawings, wherein:

FIG. 1 is a general schematic of a system embodying the present invention;

FIG. 2 is a diagram of an elementary data-flow program, illustrating certain background principles underlying the present invention;

FIG. 4 is a detailed schematic of an instruction cell, which constitutes a component of the systems of FIGS. 1 and 3;

FIG. 15 illustrates the format of the instruction cells of the present invention when containing the program of FIG. 12; and FIG. 16 illustrates the format of the instruction cells of the present invention when containing the program of FIG. 11.

DETAILED DESCRIPTION

Overview of the Preferred Embodiment

Figure 3:
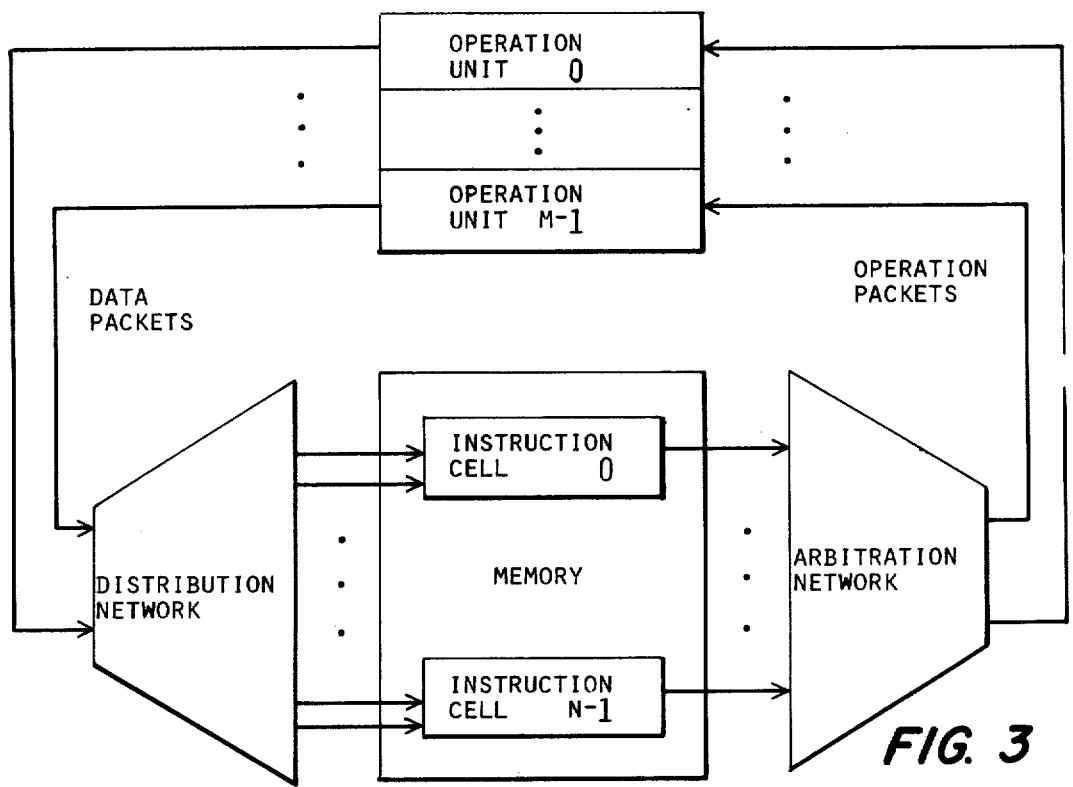
FIG. 3 is a general schematic of a system for executing the data-flow program of FIG. 2.

Generally, the embodiment of FIG. 1 comprises an active memory 20 for holding at least a record of active instructions, one or more operation units 22 for managing signals in correspondence with data computations, one or more decision units 24 for managing signals in correspondence with selections, one or more control identity units 26 for managing signals in correspondence with program control, a first arbitration network 28 for transmitting signals representing information packets from active memory 20 to operation units 22 and decision units 24, a second arbitration network 30 for transmitting signals representing information packets from active memory 20 to control identity units 26, a first control network 32 for transmitting signals representing information packets from decision units 24 to active memory 20, a second control network 34 for transmitting signals representing information packets from control identity units 26 to active memory 20, and a distribution network 36 for transmitting signals representing information packets from operation units 22 to active memory 20.

Structural details of active memory 20 are shown in the accompanying drawings and are described below and are substantially the same as details of the memory of aforementioned U.S. Pat. No. 3,962,706, in FIGS. 3, 4, 31a, 32, and 33 and at column 4, lines 12 through 47 at column 12, line 24 to column 14, line 29. Structural details of operation units 22, decision units 24, and control identity units 26 are shown in the accompanying drawings and are described below and are substantially the same as details of the functional units of aforementioned U.S. Pat. No. 3,962,706, in FIGS. 6 and 34 and at column 5, lines 1 through 12 and at column 14, lines 30 through 45. Structural details of first arbitration network 28 and second arbitration network 30 are shown in the accompanying drawings and are described below and are substantially the same as details of the arbitration network of the aforementioned U.S. Pat. No. 3,962,706, in FIGS. 35, 36, 37, and 38 and at column 14, line 46 to column 16, line 12. Structural details of first control network 32, second control network 34, and distribution network 36 are shown in the accompanying drawings and are described below and are substantially the same as details of the distribution network of aforementioned U.S. Pat. No. 3,962,706, in FIGS. 39, 40, 41, and 42 and at column 16, line 13 to column 17, line 17.

Details of the components of the foregoing system are discribed below following a discussion of the background considerations in reference to what is termed herein The Elementary Processor and The Basic Processor.

The Elementary Processor

The Elementary Processor executes programs represented in the elementary data-flow language. A program in this language is a directed graph in which the nodes are operators or links. These nodes are connected by arcs along which values (carried by tokens) may travel. An operator of the program is enabled when tokens are present on all input arcs. The enabled operator may fire at any time, removing a token from each input arc, computing a value from the operands associated with the input tokens, and associating that value with a result token placed on its output arc. A result may be sent to more than one destination by means of a link which removes a token on its input and places identical tokens on its outputs. A operator or a link cannot fire unles there is no token present on any output arc of that operator or link.

The elementary data-flow program of FIG. 2 has a token present on each input arc. Links L1 and L2 are enabled, and either one can fire — suppose L2 does. Then operator A2 and link L1 are enabled, and once again, either one can fire. In this manner, tokens travel through the program until a token appears on the output conveying the value $A(x)(x+y)$. Once operators A1 and A2 have fired, there are no tokens present on any of the arcs emanating from L1 and L2, and the links can fire as soon as the input operators deliver new values.

Figure 5:
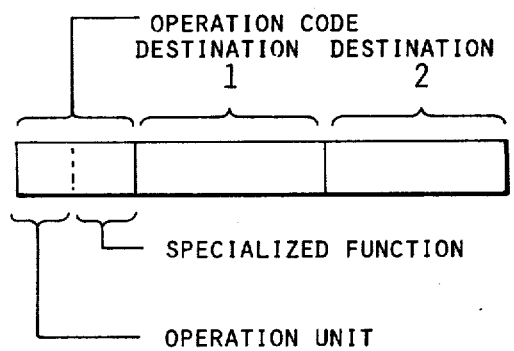
FIG. 5 is a detailed schematic of an instruction format, which describes an aspect of the instruction cell of FIG. 4.

The structure of The Elementary Processor is presented in FIG. 3, and structural details thereof are presented in related U.S. Pat. No. 3,962,706. A data-flow program to be executed is stored in the Memory of the processor. The Memory is a collection of Instruction Cells; one Instruction Cell is associated with each operator of the program. Each Instruction Cell (FIG. 4) is composed of three registers. The first register holds an instruction (FIG. 5) which specifies the operation to be performed and the addresses of the registers to which the result of the operation is to be directed. The second and third registers hold the operands for use in execution of the instruction.

When an Instruction Cell contains an instruction and the necessary operands, it is enabled and signals the Arbitration Network that it is ready to transmit its contents as an operation packet to an Operation Unit which can perform the desired function. The operation packet flows through the Arbitration Network which directs it to an appropriate Operation Unit by decoding the instruction portion of the packet.

The result of an operation leaves an Operation Unit as one or more data packets, each consisting of the computed value and the address of a register in the Memory to which the value is to be delivered. The Distribution Network accepts data packets from the Operation Units and utilizes the address contained in each to direct the data item through the network to the correct register in the Memory.

The Basic Processor

The computational capability of The Basic Processor is greater that that of The Elementary Processor due to the addition of conditional and iterative constructs to the language executed by the processor. To illustrate this additional capability, presented herein is the structure of the instruction execution section of The Basic Processor, and structural details thereof are presented in related application Ser. No. 605,932.

Figure 6:
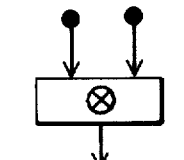
FIG. 6 illustrates symbols representing links of the basic data-flow language.
Figure 6:
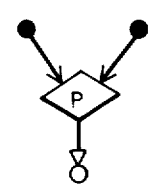
Figure 6:
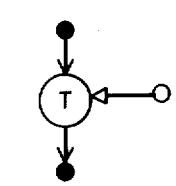
Figure 6:
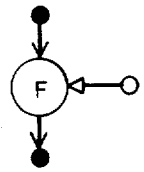
Figure 7:
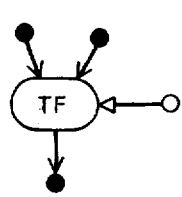
FIG. 7 illustrates symbols representing actors of the basic data-flow language.
Figure 7:
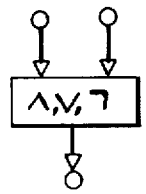

The representation of conditional and iterative program constructs in data-flow form requires additional types of links and actors beyond those described for The Elementary Processor. The types of links and actors in the basic data-flow flow language are shown in FIGS. 6 and 7.

Data values pass through data links in the manner presented previously. The tokens transmitted by control links are known as control tokens and carry a value of either true or false. A control token is generated at a decider which, when the decider receives values from its input links, applies its associated predicate, and produces either a true or false control token at its output arc. The control token produced at a decider can be combined with other control tokens by means of a Boolean operator.

Control tokens enable the flow of data tokens by means of either a I-gate, F-gate, or a merge (FIG. 7c, d, e). A T-gate will pass the data token on its input arc to its output arc when it receives a control token conveying the value true at its control input. It will absorb the data token on its input arc and place nothing on its output arc if a false-valued control token is received. Similarly, the F-gate will pass its input data token to its output arc only on receipt of a false-valued token on the control input. Upon receipt of a true-valued token, it will absorb the data token.

A merge actor has a true input, a false input, and a control input. It passes to its output arc a data token from the input arc corresponding to the value of the control token received. Any tokens on the other input are not affected.

Figure 8:
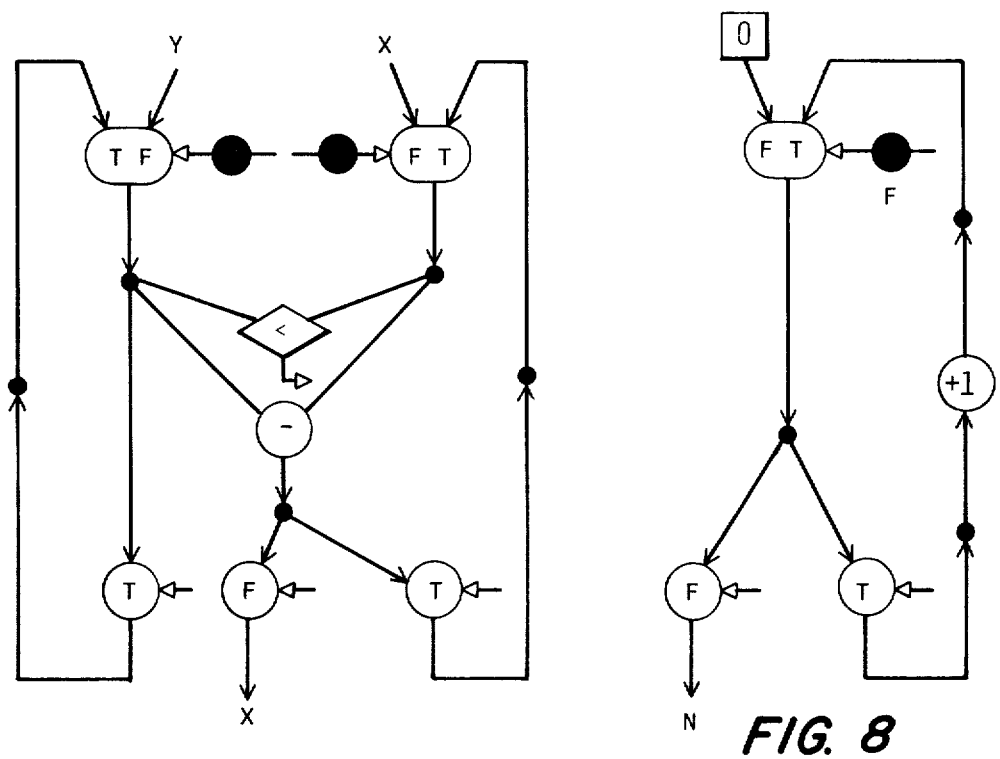
FIG. 8 is a diagram of a basic data-flow program, illustrating further background principles underlying the present invention.

In illustration of the use of the actors and links of the basic data-flow language, FIG. 8 gives a basic data-flow program for the following computation:

input x, y
n: = 0
while y < x do
    x: = x − y
    n: = n + 1 end
output x, n

In the data-flow program, the control input arcs of the gate and merge actors are to be considered connected to the output of the decider. The control input arcs of the three merge actors carry false-valued control tokens in the initial configuration to allow the input values of x and y and the constant 0 to be admitted as initial values for the iteration. Once these values have been received, the predicate y<x is tested. If it is true, the value of y and the new value of x are cycled back into the body of the iteration through the T-gates and two merge nodes. Concurrently, the remaining T-gate and merge node return an incremented value of the iteration count n. When the output of the decider is false, the current values of x and n are delivered through the two F-gates, and the initial configuration is restored.

Figure 9:
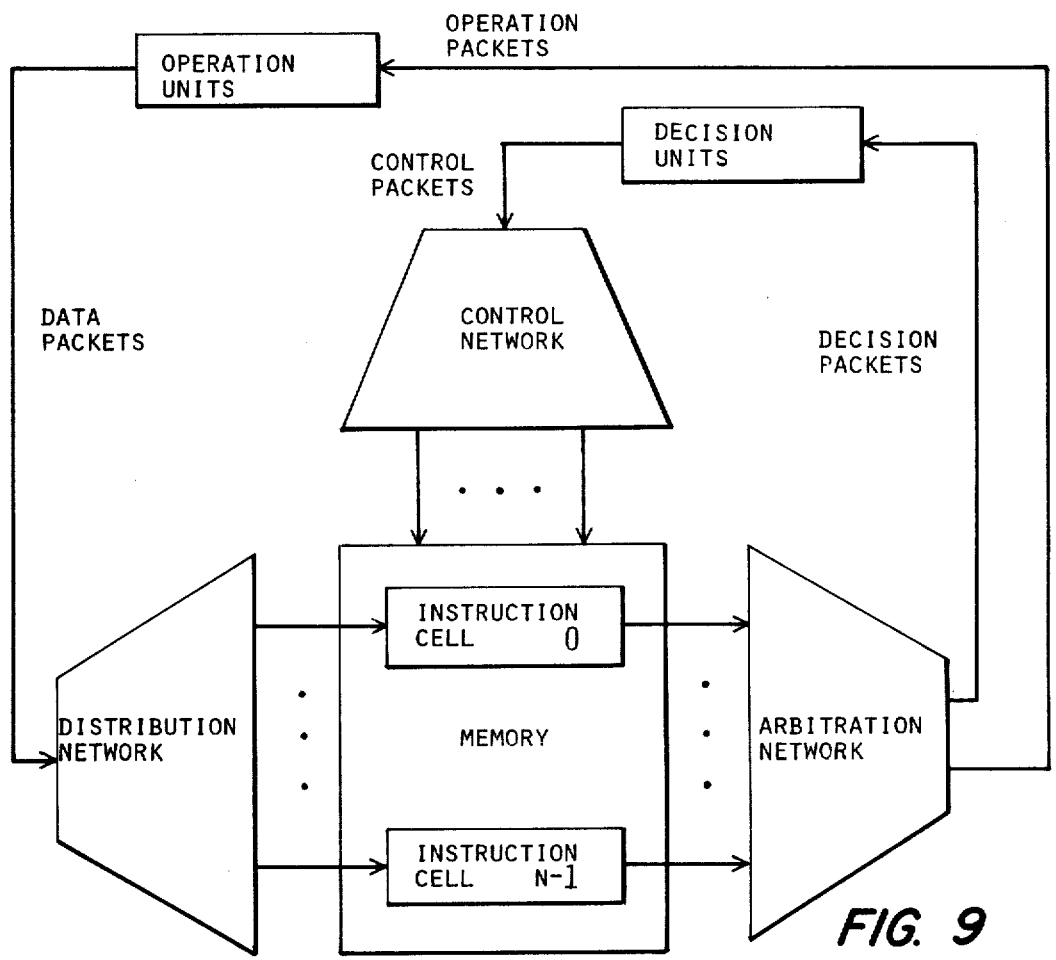
FIG. 9 is a general schematic of a system for executing the data-flow program of FIG. 8.

The organization of the instruction processing section of The Basic Processor is shown in FIG. 9. As in the elementary processor, each Instruction Cell consists of three Registers, the first of which holds an instruction, and the remaining which either contain space for a data value, for one or more Boolean values, for one or more destination Cell identifiers, or for a combination of the three. Each instruction corresponds to an operator or a decider of a basic data-flow program. The gate and merge actors of the data-flow program are not represented by separate instructions; rather, the function of the gates is incorporated into the instructions associated with operators and deciders, and the function of the merge actors is implemented for free by the nature of the Distribution Network.

As in The Elementary Processor, the Operation Units of The Basic Processor correspond to operators of a data-flow program. The Decision Units of The Basic Processor correspond to deciders of a program, and each produces a control packet containing either the value true or the value false for each destination upon receipt of a decision packet containing a decision specification, one or more destination specifications, and the necessary operands.

Each data or Boolean value held as an operand by an Instruction Cell has associated with it a gating code which specifies whether the associated value is to be true-gated, false-gated, not gated at all, or is a constant. The specification of a true or false gating code designates that the associated register is enabled only upon receipt of a data or Boolean value and a control value of type matching the gating code. The receipt of a control value not matching the gating code causes the corresponding data or Boolean value to be discarded upon arrival.

The Deadlock-Free Architecture

The deadlock problem in The Elementary Processor and The Basic Processor arises due to the fact that an operator or link of a data-flow program being executed in either of the processors does not necessarily obey the rule that an operator or link cannot fire unless there is no token on the output arc of that operator or link. Thus, it is possible for a number of values destined for the same register to be in the Distribution Network simultaneously. In such a case, several values will be stored in buffers within the Distribution Network, blocking access to succeeding portions of the network and preventing any other packets from being transferred to the portion of the Memory serviced by the succeeding portions of the network. A deadlock condition arises when one of the stored values blocks a packet which is needed by the program in order to enable the Cell to which the blocked packet is destined.

The solution to the deadlock problem requires the addition of a form of feedback between operators of a program in order to place an upper bound on the number of tokens which may be present upon an arc of a given data-flow program. This feedback is accomplished through the backward flow of control tokens. For this purpose a new type of control token is introduced, having value control to differentiate it from the Boolean control tokens which have value true or false.

Figure 10:
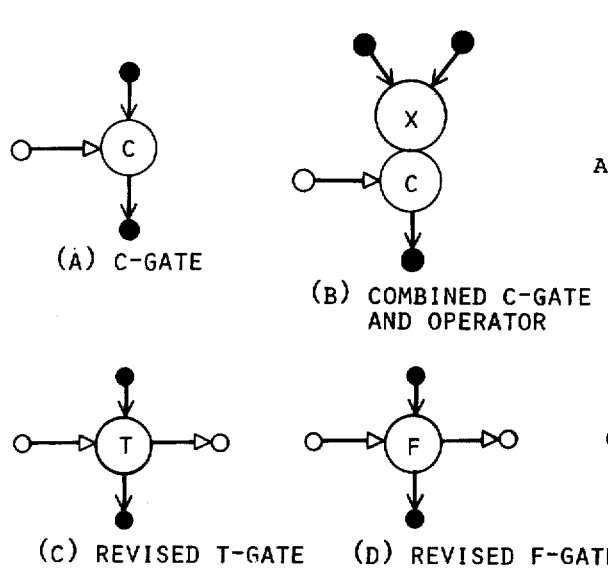
FIG. 10 illustrates symbols representing additional actors of the elementary and basic data-flow languages of the present invention.

A control-valued control token is produced at a decider with the nil predicate, and controls the flow of data tokens by means of a C-gate or control-gate (FIG. 10). Such a gate is enabled upon receipt of a data value and a control-valued control token, and upon firing, transfers the data value from its data input arc to its output arc. An operator and gate may be combined as in FIG. 10b. Such a joint operator is enabled when there is a data token present on each data input and a control-valued token is present on the control input arc.

A deadlock-free version of a pipelined data-flow program is constructed from the original version by replacing each operator which could possibly place multiple tokens on its output arc by a joint operator and gate. The gate is controlled by the output of succeeding operators. When the link on the output of each of these succeeding operators receives a data token, it sends one copy to a decider with the nil predicate. This decider generates a control-valued token which is passed to the gate on the output of the first operator, allowing that operator to become reenabled as soon as all necessary operands are present.

Figure 11:
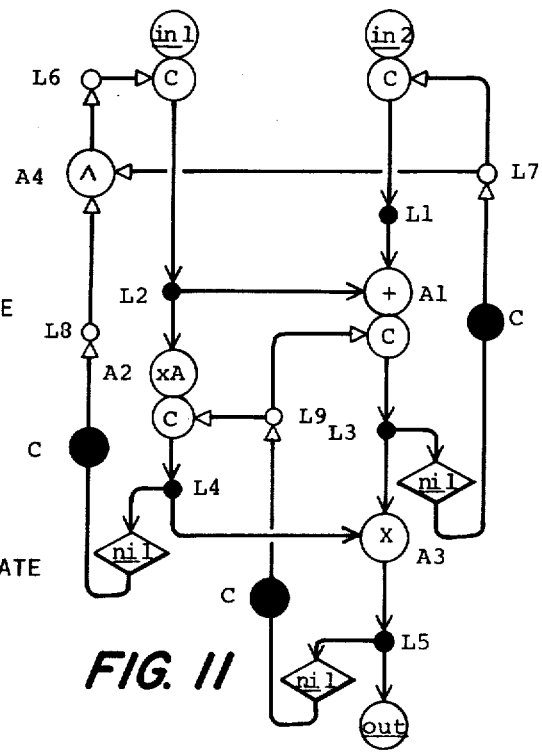
FIG. 11 is a diagram of a deadlock-free version of the elementary data-flow program of FIG. 2 in accordance with the present invention.

A deadlock-free version of the elementary data-flow program of FIG. 2 is shown in FIG. 11. The program contains an initial marking of control-valued tokens which permit only one token to be present on each arc of the program. To establish a larger bound on the number of tokens on an arc of the program, the initial marking must contain several control-valued tokens on each arc. Link 12 of the program provides a fan-out of two for the values produced by input operator 1, and hence, the control token for that operator is produced by ANDing two control-valued tokens from the succeeding operators A1 and A2.

In the case of an iterative data-flow program, deadlock can arise due to possible conflict between tokens of simultaneously active cycles of the iteration. The addition of feedback to an iterative program assures that all operations of one cycle of the iteration are concluded before the next cycle is initiated.

Figure 12:
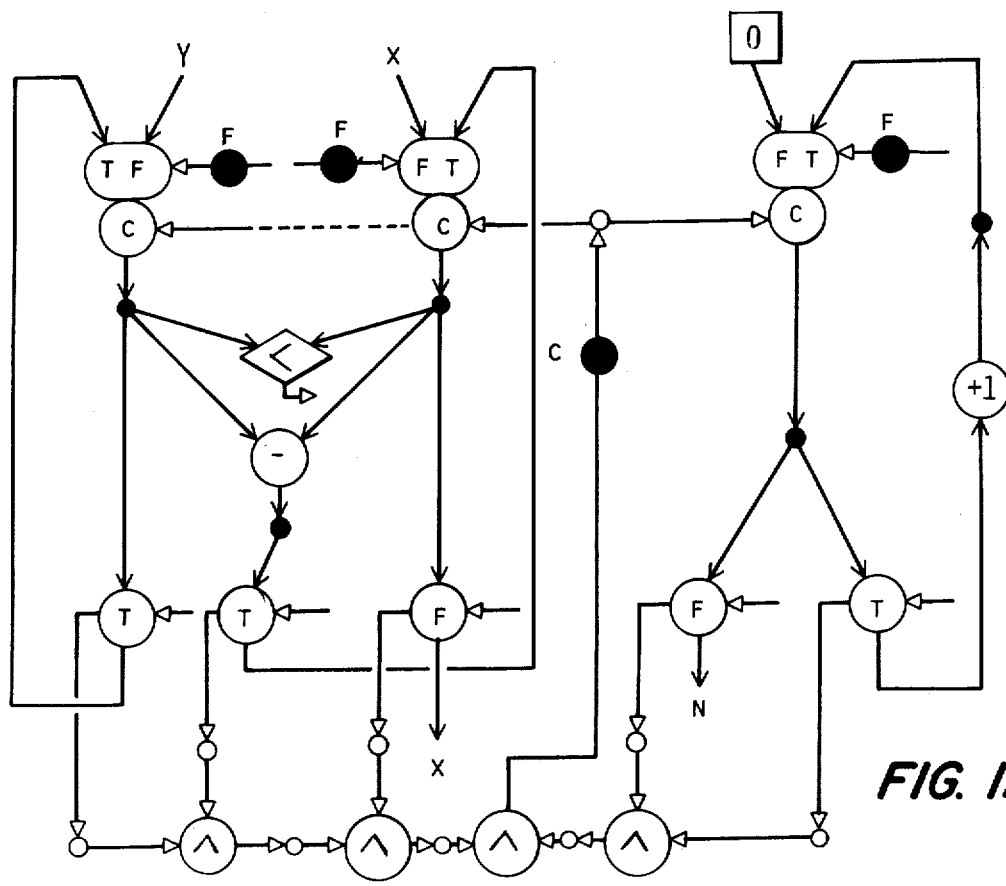
FIG. 12 is a diagram of a deadlock-free version of the basic data-flow program of FIG. 8, in accordance with the present invention.

Due to the fact that there exist alternate paths in an iterative data-flow program, to insure freedom from deadlock, the structure of a T- or F-gate must be redefined as shown in FIG. 10c, d. Each T- or F-gate of the program operates in the manner described previously, however, the gate is required to generate a control-valued token upon firing, regardless of whether the firing of the gate actor propogates its input data value or not. The deadlock-free version of the iterative data-flow program of FIG. 8 is shown in FIG. 12.

The merge actors must now be included as separate instructions in the implementation of the iterative data-flow program since they are now utilized to control the initiation of each cycle of the iteration. This control is accomplished by placing a C-gate on the output of each merge actor, permitting the actor to become enabled only after receiving a data value and a control-valued control token.

Through use of such feedback loops in a data-flow program, one can precisely control the number of tokens on a given arc of the program. The number of tokens allowed on a single arc may vary, due to architectural constraints to be presented next.

The deadlock-free architecture of The Basic Processor is presented in FIG. 1. The difference between the processor depicted in FIG. 1 and the processor presented in FIG. 9 arises in the structure of the Memory Cells and in the addition of a second Arbitration Network, Control Identity Units, and a second Control Network for the conveyance of control-valued control packets.

Figure 13:
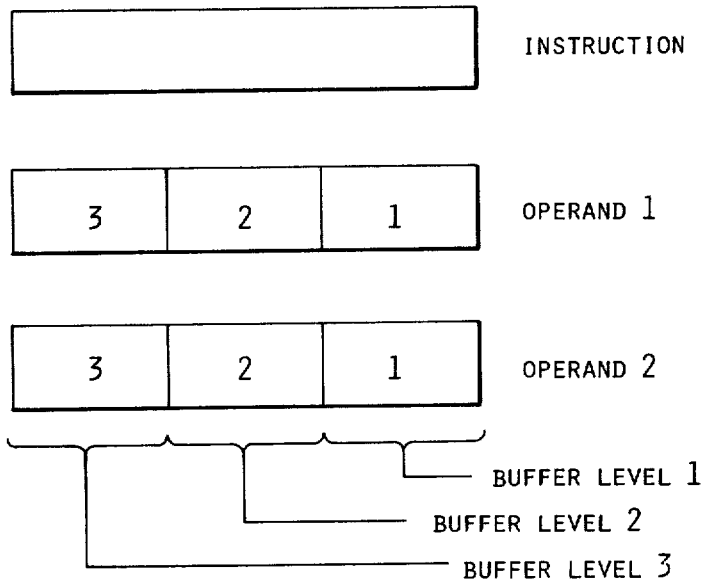
FIG. 13 illustrates the revised instruction cell format of the present invention.

The revised Instruction Cell format for The Basic Processor is shown in FIG. 13. Each operand register of the Instruction Cell is structured as a first-in-first-out (FIFO) queue. The depth of this queue determines the number of data packets which can be simultaneously destined for the operand register, and hence determines the maximum number of tokens which can be present on an arc of a data-flow program. The Instruction Cell of FIG. 13 has a queue of depth three in each operand register, hence up to three tokens may be present on an arc of a program in such a processor.

Figure 14:
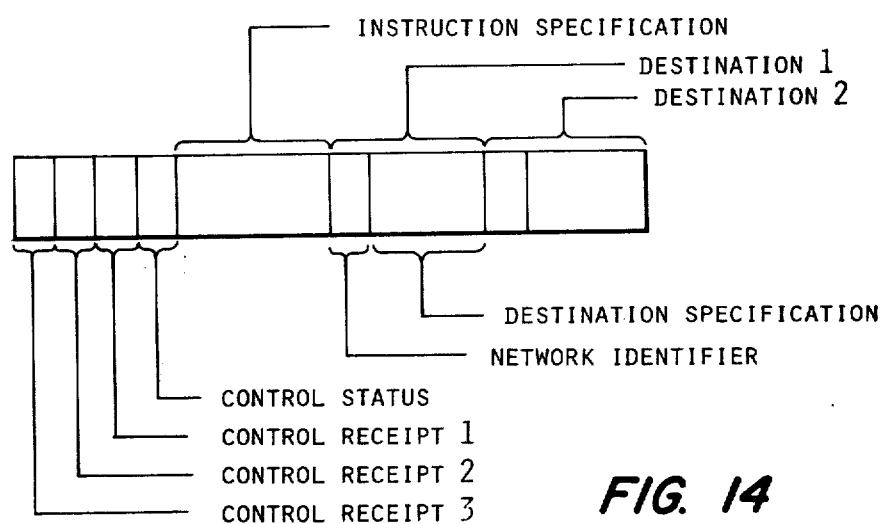
FIG. 14 illustrates a detail of an instruction cell format of FIG. 13.

The revised instruction format is shown in FIG. 14. Each destination address has a network identifier associated with it. This identifier specifies whether the address is a destination address for a value generated at the appropriate Operation or Decision Unit or is an address to which a control-valued control packet is to be sent. The identifier performs this specification function by designating one of the two Arbitration Networks, the first of which delivers operation and decision packets to the Operation and Decision Units, and the second of which accepts control packets from the Memory and delivers them to the Control Identity Units. The Control Identity Units present each control packet received to the second Control Network for conveyance to the proper desination Instruction Cell.

Each instruction contains a control status field which specifies the number of control-valued packets which must be received in order for the instruction to become reenabled. A number of control receipt fields equal to the operand queue depth are used to note the arrival of control-valued packets at the Cell; one control receipt field is associated with each level of the operand queue. The control receipt fields also operate as a FIFO queue; that is, when the first control receipt field is cleared after transmission of the Cell content to the first Arbitration Network, each of the remaining fields shift up on field, and the last field is set to zero. Initially, all fields have value zero.

The control receipt field of an Instruction Cell is utilized to perform the ANDing of control tokens from the appropriate destination Cells. To avoid conflict in a processor which has an operand queue length greater than one between control-valued packets from the same succeeding Cell, each control-valued packet has associated with it an integer value which is unique among the control packets received by a Cell.

A control-valued packet conveying the unique integer value x received by a Cell in a processor which has operand queue length m is processed in the following manner:

1. let the value of the variable d be 0
2. if the xth bit of control receipt field d equals 1
   then go to step 3
   else set the xth bit of control receipt field d to 1
   stop
3. if d has value m
   then signal an error
   else d receives a new value equal to the old value of d plus 1
   go to step 2

This procedure insures that there will be no conflict between control-valued packets generated by the same Cell. If several control-valued packets are received by a Cell from the same succeeding Cell, their receipt will be noted in different control receipt fields of the Cell.

An Instruction Cell is enabled when all three registers of the Cell are enabled. An instruction register is enabled when there is an instruction present in the register and the value contained in the first control receipt field is equal to the control status value. An operand register is enabled upon receipt of a data or Boolean value and an appropriate control value. When all three registers are enabled, the instruction specification, destination specifications whose associated network identifiers designate the first Arbitration Network, and the first set of operands in the operand queues are transmitted to the first Arbitration Network, and the first element of each operand queue and the first control receipt field are emptied. Simultaneously, an appropriate control-valued packet is placed in the second Arbitration Network for each destination address which has an associated network identifier designating the second Arbitration Network.

To assure freedom from deadlock, each Instruction Cell is also required to provide a control-valued packet upon consumption of any data or Boolean value by a gate actor contained in the Cell. This is accomplished by having a Cell, upon consumption of a data or Boolean value, place in the second Arbitration Network a control-valued packet for each destination with a network identifier designating the second Arbitration Network.

If the buffer length of a processor is equal to one then it is not necessary to associate an integer value with each control-valued packet since each succeeding Instruction Cell can send at most one control-valued packet between successive enablings of an Instruction Cell. In such a case, each Instruction Cell must merely count the number of control-valued packets which arrive, and a Cell is enabled when all operands are present and the correct number of control-valued packets have been received.

Structural details of the Instruction Cell detailed in FIGS. 13 and 14, a plurality of which form the memory of the processor, are substantially the same as details of the Instruction Cell described in FIGS. 3, 4, 31a, 32, and 33 and at column 4, lines 12 through 47 and at column 12, line 24 to column 14, line 29 of U.S. Pat. No. 3,962,706. The buffering capability provided in an Instruction Cell through operation of its operand registers as queues is incorporated through use of several additional bit pipeline modules and associated synchronization and signalling components connected to each operand register so as to effectively extend the length of each register in a manner similar to that described in FIG. 32 of aforementioned U.S. Pat. No. 3,962,706. The network identifier associated with each destination specification is treated as part of the destination specification, determining the path taken upon transmission of a packet from the Instruction Cell. This determination is implemented through use of counter and switch modules as described for the function switch unit detailed in FIG. 38 of aforementioned U.S. Pat. No. 3,962,706. The control status and control receipt fields of the Instruction Cell utilize bit pipeline modules of aforementioned U.S. Pat. No. 3,962,706, the bit pipeline modules arranged in a number of queues, one for each destination. An address switch such as that described in FIG. 40 of U.S. Pat. No. 3,962,706 channels control-valued packets which are received at the Instruction Cell into the correct queues, determined by the unique integer value x associated with each packet. The control status constant determines which bit pipeline queues must have values in them in order for the instruction register to become enabled. This structure effectively implements the procedure description of the handling of control-valued packets by an Instruction Cell. Each operand register of the Instruction Cell has substantially the same structure as that detailed for the operand register in FIG. 32 of U.S. Pat. No. 3,962,706, preceeded by a bit pipeline queue. A register module holding an operand is extended slightly beyond that described in FIG. 32 of U.S. Pat. No. 3,962,706 to incorporate a register holding the gating flag and a further register holding a received Boolean true or false control value. The gating code is held in a data switch described in FIG. 9 of U.S. Pat. No. 3,962,706, and the recieved Boolean value in a further bit pipeline. Appropriate comparison of the recieved control value and the gating code is performed through circuitry consisting of a C-Module as described in FIGS. 8a, 8b, and 8c of U.S. Pat. No. 3,962,706 and a counter as described in FIG. 20 of U.S. Pat. No. 3,962,706 and miscellaneous attendant circuits to compare the gating code with the received data value through use of the C-Module and either empty the bit pipeline containing the received Boolean value by the counter if the values do not match or signal the remainder of the instruction register if they do, allowing the instruction register to become enabled. The enabling of an Instruction Cell is as described in FIG. 33 of U.S. Pat. No. 3,962,706, each register signals that it is enabled, and upon receipt of signals from all three registers, the contents of the cell are transferred to the Arbitration Network.

Structural details of first arbitration network 28 and second arbitration network 30 are substantially the same as details of the arbitration network shown in FIGS. 35, 36, 37, and 38 and at column 14, line 46 to column 16, line 12 of U.S. Pat. No. 3,962,706. The structure of the second arbitration network differs from that of the first arbitration network and that shown in FIG. 35 of U.S. Pat. No. 3,962,706 in that the Serial/Parallel Converter and Buffer modules in FIG. 35 of U.S. Pat. No. 3,962,706 are eliminated from the second arbitration network. There is no need for these Serial/Parallel Converter and Buffer modules in the second arbitration network due to the limited size of packets transferred through this network.

Structural details of operation units 22, decision units 24, and control identity units 26 are substantially the same as details of the Functional Units shown in FIGS. 6 and 34 and described at Column 5, lines 1 through 12 and at column 14, lines 30 through 45 of U.S. Pat. No. 3,962,706. The difference between the operation units 22, the decision units 24, and the control identity units 26 lies in the function of the Operation Unit shown in FIG. 34 of U.S. Pat. No. 3,962,706. In the case of the operation units 22, this Operation Unit of U.S. Pat. No. 3,962,706 performs arithmetic and logical operations such as those performed by the Arithmetic Logic Unit (ALU) of a typical digital computer. In the case of a decision unit 24, the Operation Unit of U.S. Pat. No. 3,962,706 performs test and comparison operations such as those performed by digital magnitude comparators as the 7485. In the case of the control identity unit 26, the Operation Unit of U.S. Pat. No. 3,962,706 consists of a path which transfers one of the operands directly to the output with no modification.

Structural detatils of distribution network 36 are substantially the same as details of the distribution network shown in FIGS. 39, 40, 41, and 42 and at column 16, line 13 to column 17, line 17 of aforementioned U.S. Pat. No. 3,962,706.

Structural details of first control network 32 and second control network 34 are substantially the same as details of the distribution network shown in FIGS. 39, 40, 41, and 42 and at column 16, line 13 to column 17, line 17 of aforementioned U.S. Pat. No. 3,962,706. The first control network 32 and second control network 34 are structurally similar, and the difference between these two units and that described in FIG. 39 of U.S. Pat. No. 3,962,706 lies in the elimination of the Buffer and Parallel/Serial Conversion module from the networks. This module is not needed due to the simple Boolean nature of the data being transferred.

The initial contents of Instruction Cells for the iterative data-flow program of FIG. 12 is presented in FIG. 15. For the sake of simplicity, the destination address field of each instruction holds the specification of all required destinations.

The Cell configuration depicted in FIG. 15 has buffer length of one, however, integer values are associated with control-valued packets to demonstrate their use. The control status value in each instruction register is underlined to indicate that it is a constant and to differentiate it from the value contained in the preceeding control receipt field. Cells 0, 1, and 6 have initial values of 1 in their control receipt fields to initiate the computation. A destination address preceeded by a c and an integer value designates that a control-valued packet with the specified value is to be placed in the second Arbitration Network at the appropriate time, as described previously.

An empty operand register contains a dash. Each non-empty operand register contains first a gating code specifying whether the register is to act as a T-gate (true), a F-gate (false), is not gated (no), or contains a constant (cons). The remaining fields of each operand register contain the initial data and Boolean values necessary for the computation. Operand registers which are initially empty are indicated by parentheses.

Initially, Cells 0, 1, and 6 are enabled, and upon processing by an identity operation unit, pass the initial values of x, y, and 0 into the body of the iteration contained in Cells 2, 3, and 7. Cells 0, 1, 4, 7, and 8 each generated a control-valued packet upon execution of a gating action. The control values produced by these Cells and ANDed by Cell 5, which sends out control packets to reenable Cells 0, 1, and 6.

The structure of a deadlock-free version of The Elementary Processor is similar to the deadlock-free version of The Basic Processor with the exception that there are no Decision Units and no corresponding first Control Network. The structure differs from that of The Elementary Processor presented previously by the addition of a Control Network and a second Arbitration Network which connects to the Control Network.

The required modifications to the Operation Units and the instruction format of The Elementary Processor to achieve deadlock-free operation are identical to those utilized in The Basic Processor, and the instruction format shown in FIG. 13 is valid for The Elementary Processor. Buffering of operands is ulitized to allow several packets to simultaneously specify the same destination register, and the depth of the buffering controls the number of values which may have a common destination. Addition of the control status and control receipt fields permits the ANDing of control tokens from several destinations.

The intitial contents of the Instruction Cells for the deadlock-free version of the elementary data-flow program of FIG. 11 is shown in FIG. 16. Initially Cells 0 and 1 of the program are enabled and are directed to an input Operation Unit. Two input values are accepted over channels 1 and 2 and are sent as data packets through the Distribution Network to registers 7, 10, and 11. Upon transferring their contents as operation packets to the Arbitration Network, Cells 0 and 1 cannot be enabled again until each has received the specified number of control-valued packets. These control packets are provided to Cells 0 and 1 by Cells 2 and 3.

Since certain changes may be made in the foregoing specification and the accompanying drawings without departing from the scope of the present invention, it is intended that all matter of the present disclosure be interpreted in an illustrative and not in a limiting sense.

What is claimed is:

1. A digital data processor comprising:
   (a) active memory means for holding at least a record of active instructions, said active memory means containing a plurality of cells, each cell holding one instruction of said record of active instructions and each cell having a unique index;
   (b) operation means for managing signals in the execution of arithmetic and logical operations on signals representing data values;
   (c) decision means for managing signals in the execution of comparison and testing operations on signals representing data values;
   (d) control identity means for managing signals in the execution of identity operations on signals representing control values;
   (e) first arbitration means operatively connected between said active memory means and said operation means and between said active memory means and said decision means for concurrently transmitting signals representing a plurality of first information packets from said active memory means to said operation means and said decision means, each of said signals representing first information packets consisting of signals representing an instruction of said record of active instructions together with data values required for its execution;
   (f) second arbitration means operatively connected between said active memory means and said control identity means for concurrently transmitting signals representing a plurality of second information packets from said active memory means to said control identity means, each of said signals representing second information packets consisting of signals representing control values necessary to insure correct operation of said digital data processor;
   (g) first control means operatively connected between said decision means and said active memory means for concurrently transmitting signals representing a plurality of third information packets from said decision means to said active memory means, each of said signals representing third information packets consisting of signals representing Boolean values computed by said decision means and required for the execution of said record of active instructions contained in said cells of said active memory means;
   (h) second control means operatively connected between said control identity means and said active memory means for concurrently transmitting signals representing a plurality of fourth information packets from said control identity means to said active memory means, said signals representing fourth information packets consisting of signals representing control values necessary to insure correct operation of said digital data processor; and
   (i) distribution means operatively connected between said operation means and said active memory means for concurrently transmitting signals representing a plurality of fifth information packets from said operation means to said active memory means, said signals representing fifth information packets consisting of signals representing data values computed by said operation means and required for execution of said record of active instructions contained in said active memory means.

2. The digital data processor of claim 1, wherein said active memory means includes a plurality of cells, each of said cells having register means, said register means consisting of means for holding information, records.

3. The digital data processor of claim 2 wherein said information records include a set of instructions and data items.

4. The digital data processor of claim 3 wherein each of said instructions includes control status means, control receipt means, and a set of functional specifications and destination indices.

5. The digital data processor of claim 4 wherein each of said functional specifications includes a set of operational specifications and decision specifications, each of said operational specifications designating a function performed by said operation means and each of said decision specifications designating a function performed by said decision means.

6. The digital data processor of claim 4 wherein said destination indices consist of unique cell indicia and routing specifications, said unique cell indicia each designating the unique index of a cell.

7. The digital data processor of claim 6 wherein each of said routing specifications specifies whether said unique cell indicia associated with the routing specification are to be included with said first information packets transmitted to said first arbitration means or said second information packets transmitted to said second arbitration means.

8. The digital data processor of claim 4 wherein said control status means consists of means for holding control indicia.

9. The digital data processor of claim 8 wherein each of said control indicia specifies the number of said fourth information packets which must be received from said second control means before said first information packets are transmitted to said first arbitration means and said second information packets are transmitted to said second arbitration means.

10. The digital data processor of claim 4 wherein said control receipt means consists of means for holding control records.

11. The digital data processor of claim 10 wherein each of said control records indicates the availability of cells to receive said fifth information packets from said distribution means and said third information packets from said first control means.

12. The digital data processor of claim 10 wherein each of said control records represents a recording of the arrival of said fourth information packets from said second control means.

13. The digital data processor of claim 3 wherein each of said data items consists of means for holding a plurality of data records.

14. The digital data processor of claim 13 wherein each of said data records consists of means for holding a set of data values or control values and indicia indicating the presence of said data values and control values.

15. The digital data processor of claim 14 wherein each of said data values is delivered to said cell in said fifth information packet received from said distribution means.

16. The digital data processor of claim 14 wherein each of said control values is delivered to said cell in said third information packet received from said first control means.

17. The digital data processor of claim 1 wherein said operation means performs arithmetic and logical operations on signals representing first information packets conveying data values received from said first arbitration means and transmits results achieved from the execution of an arithmetic or logical operation on the received signals representing data values as signals representing said fifth information packets to said distribution means.

18. The digital data processor of claim 17 wherein said first information packets are received by said operation means from said first arbitration means, said first information packets containing destination cell indices and all relevant operands, and said fifth information packets directed from said operation means to said distribution means include destination cell indices and result values.

19. The digital data processor of claim 1 wherein said decision means performs comparison and testing operations on signals representing second information packets conveying data values received from said second arbitration means and transmits results achieved from the execution of comparison or testing operations on the received signals representing data values as signals representing said third information packets to said first control means.

20. The digital data processor of claim 19 wherein said first information packets are received by said decision means from said first arbitration means, said first information packets containing destination cell indices and all relevant operands, and said third information packets directed from said decision means to said first control means include destination cell indices and control values.

21. The digital data processor of claim 1 wherein said control identity means performs identity operations on signals representing second information packets received from said second arbitration means and transmits results achieved from the execution of identity operation on the recieved signals representing control values as signals representing said fourth information packets to said second control means.

22. The digital data processor of claim 21 wherein said second information packets are received by said control identity means from said second arbitration means, said second information packets containing destination cell indices and control values, and said fourth information packets directed from said control identity means to said second control means include destination cell indices and control values.

23. A digital data processor comprising:
(a) active memory means for holding at least a record of active instructions, said active memory means containing a plurality of cells, each cell holding one instruction of said record of active instructions and each cell having a unique index;
(b) operation means for managing signals in the execution of arithmetic and logical operations on signals representing data values;
(c) control identity means for managing signals in the execution of identity operations on signals representing control values;
(d) first arbitration means operatively connected between said active memory means and said operation means for concurrently transmitting signals representing a plurality of first information packets from said active memory means to said operation means, each of said signals representing first information packets consisting of signals representing an instruction of said record of active instructions together with data values required for its execution;
(e) second arbitration means operatively connected between said active memory means and said control identity means for concurrently transmitting signals representing a plurality of second information packets from said active memory means to said control identity means, each of said signals representing second information packets consisting of signals representing control values necessary to insure correct operation of said digital data processor;
(f) second control means operatively connected between said control identity means and said active memory means for concurrently transmitting signals representing a plurality of fourth information packets from said control identity means to said active memory means, said signals representing fourth information packets consisting of signals representing control values necessary to insure correct operation of said digital processor; and (g) distribution means operatively connected between said operation means and said active memory means for concurrently transmitting signals representing a plurality of fifth information packets from said operation means to said active memory means, said signals representing fifth information packets consisting of signals representing data values computed by said operation means and required for execution of said record of active instructions contained in said active memory means.

* * * * *

UNITED STATES PATENT AND TRADEMARK OFFICE
CERTIFICATE OF CORRECTION

PATENT NO. : 4,145,733
DATED : March 20, 1979
INVENTOR(S) : David P. Misunas and Jack B. Dennis It is certified that error appears in the above-identified patent and that said Letters Patent are hereby corrected as shown below:

On Pages 1 and 2 under the section entitled "RELATED APPLICATIONS", the last paragraph thereof should read as follows: --The work resulting in this invention was supported by Grant No. DCR 75-04060 awarded by the National Science Foundation and Contract No. N00014-75-C-0661 awarded by the U.S. Department of the Navy.--

Signed and Sealed this

Third Day of July 1979

[SEAL]

Attest:

*Attesting Officer*

LUTRELLE F. PARKER
*Acting Commissioner of Patents and Trademarks*